(12) United States Patent
Klipfel et al.

(10) Patent No.: US 7,533,659 B2
(45) Date of Patent: May 19, 2009

(54) EXHAUST-GAS RECIRCULATION VALVE

(75) Inventors: Bernhard Klipfel, Karlsruhe (DE); Christoph Thiery, Ilvesheim (DE)

(73) Assignee: Cooper-Standard Automotive (Deutchland) GmbH, Schelklingen (DE)

( * ) Notice: Subject to any disclaimer, the term of this patent is extended or adjusted under 35 U.S.C. 154(b) by 0 days.

(21) Appl. No.: 11/823,840

(22) Filed: Jun. 28, 2007

(65) Prior Publication Data

US 2008/0029073 A1  Feb. 7, 2008

(30) Foreign Application Priority Data

Jul. 6, 2006  (EP)  ................................. 06014036

(51) Int. Cl.
*F02B 47/08* (2006.01)
*F02B 47/00* (2006.01)

(52) U.S. Cl. ............................. 123/568.24; 123/568.23

(58) Field of Classification Search ............ 123/568.11, 123/568.17, 568.21, 568.23, 568.24, 568.26
See application file for complete search history.

(56) References Cited

U.S. PATENT DOCUMENTS

| | | | |
|---|---|---|---|
| 3,817,490 A | 6/1974 | Deeg | |
| 4,171,689 A | 10/1979 | Eheim | |
| 6,772,729 B2 * | 8/2004 | Brosseau et al. | 123/308 |
| 2003/0010314 A1 * | 1/2003 | Brosseau et al. | 123/306 |
| 2003/0116146 A1 * | 6/2003 | Fensom et al. | 123/568.21 |
| 2003/0136388 A1 * | 7/2003 | Brosseau et al. | 123/568.18 |

FOREIGN PATENT DOCUMENTS

| | | |
|---|---|---|
| DE | 27 03 687 A1 | 8/1978 |
| EP | 0 856 657 B1 | 8/1998 |
| EP | 1 020 633 A1 | 7/2000 |
| EP | 1 245 820 A1 | 10/2002 |
| EP | 1 526 272 A1 | 4/2005 |
| GB | 815391 | 6/1959 |

OTHER PUBLICATIONS

Search Report from European Application No. 06014036, dated Oct. 31, 2006.

* cited by examiner

*Primary Examiner*—Mahmoud Gimie
(74) *Attorney, Agent, or Firm*—Wolf, Greenfield & Sacks, P.C.

(57) ABSTRACT

An exhaust-gas recirculation (EGR) valve includes a rotary drive. The rotary drive includes a cam member that has a cam profile. The rotary drive permits operation of a valve member that can be rotated around a rotational shaft. During the course of a closing movement, the EGR valve can, toward the end of the closing movement, move towards a valve seat in a direction that is generally parallel to a direction of flow through the valve seat.

4 Claims, 3 Drawing Sheets

EXHAUST-GAS RECIRCULATION VALVE

CROSS REFERENCE TO RELATED APPLICATION

Foreign priority benefits are claimed under 35 U.S.C. §119(a)-(d) or 35 U.S.C. §365(b) of European Application No. EP 06 014 036.5, filed Jul. 6, 2006, which is hereby incorporated by reference in its entirety.

BACKGROUND

1. Field

Aspects of the invention relate to internal combustion engines and in particular to exhaust-gas recirculation (EGR) valves for internal combustion engines.

2. Discussion of Related Art

It is well known in the field of automotive engineering and, in particular, in connection with emissions and fuel efficiency improvements of internal combustion engines to provide an exhaust-gas recirculation system.

Various types of EGR valve operations are known. For example, to open and close the valve, i.e. to release the valve member from its valve seat and seat the valve on its seat, a translational movement may be employed. In this respect, it is known from EP 0,856,657B1 that a cam is driven in a rotating manner by a drive mechanism and which engages with a translationally movable valve tappet so as to move the valve tappet translationally whenever the cam moves in a rotating manner. In this manner, the valve tappet may be lifted from its valve seat.

Another EGR valve is known from EP 1,245,820A1. In this example, a rotational movement is transferred, as a result of a suitable transmission means, to the valve member. The valve member may be a fold-down valve disk that moves rotationally between an open and a closed position.

DE 2703687A1 relates to a device for controlling an exhaust-gas recirculation system in which a flap that is disposed within the intake manifold and an EGR line protruding into the intake manifold can close in a closed position.

EP1,526,272A1 describes an EGR valve in which the valve member moves in an orbit in such a way that, when the closing movement is nearly complete, the valve member moves toward the valve seat to a certain extent tangentially, i.e. in a generally perpendicular manner relative to the direction of flow through the valve seat.

SUMMARY

According to one embodiment, an exhaust-gas recirculation (EGR) valve is provided. The EGR valve includes a rotary drive. The rotary drive has a cam member with a cam profile. The rotary drive permits operation of a valve member that can be rotated around a rotational shaft. Rotation of the cam member results in a rotation of the rotational shaft. During the course of a closing movement, the EGR valve can, toward the end of the closing movement, move toward a valve seat in a direction that is generally parallel to a direction of flow through the valve seat.

In another illustrative embodiment, an exhaust-gas recirculation (EGR) valve is provided. The EGR valve includes a rotary drive and a cam member having a cam profile. The cam member cooperates with the rotary drive. A shaft rotatably cooperates with the cam member whereby a rotation of the cam member results in a rotation of the shaft. A valve member cooperates with the shaft whereby the rotary drive rotates the valve member about the rotational shaft. A valve seat cooperates with the valve member. During the course of a closing movement and toward the end of the closing movement, the valve member moves toward the valve seat in a direction that is generally parallel to a direction of flow through the valve seat.

In yet another illustrative embodiment, an exhaust-gas recirculation (EGR) valve is provided. The EGR valve includes a valve housing having a valve seat and a flow passage therethrough and a valve member cooperating with the valve seat and being operable to open and close the flow passage through the valve seat. A drive arrangement is configured to drive the valve member relative to the valve seat such that the valve member rotates about an axis whereby the valve member moves toward the valve seat in a direction that is initially in a direction that is generally perpendicular to a direction of flow through the valve seat and when the closing movement is nearly complete, the valve member moves toward the valve seat in a direction that is generally parallel to a direction of flow through the valve seat.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

Figure 1:
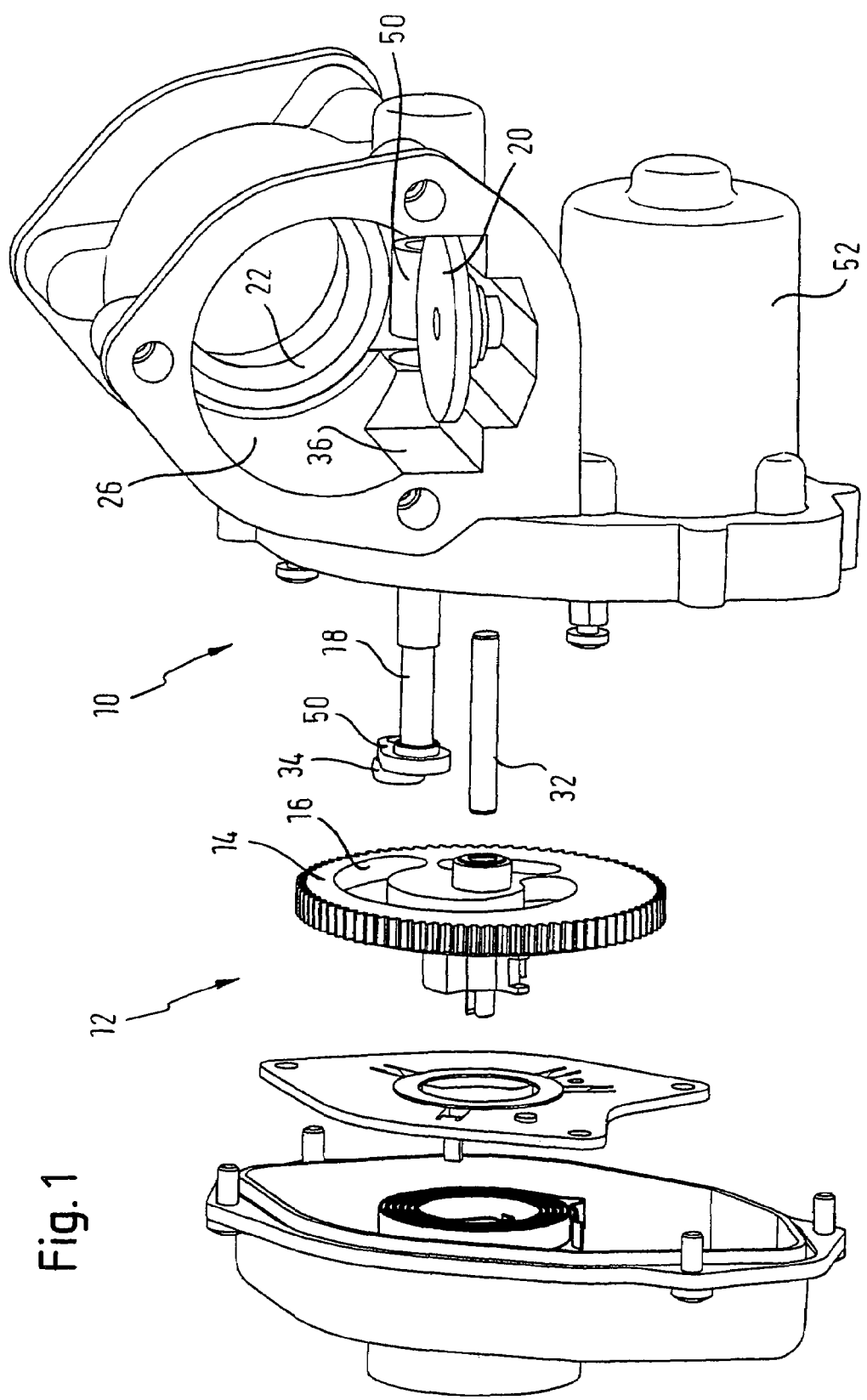
FIG. 1 is an exploded perspective view of an exhaust-gas recirculation valve according to a first embodiment.

Aspects of the invention are directed to exhaust-gas recirculation (EGR) valves. In one embodiment, the EGR valve may provide enhanced performance when used in low-pressure EGR systems. Of course, the EGR valve may be employed in other EGR systems, as the present invention is not limited in this respect.

According to one embodiment, the EGR valve comprises a rotary drive that has a cam member with a cam profile. The rotary drive permits operation of a valve member that can be rotated around a rotational axis. With regard to this type of drive, the entire disclosure of EP 1,526,272 A1 is incorporated herein by reference in its entirety. In one embodiment, the EGR valve is characterized in that, during a closing movement, the valve member, when the closing movement is nearly complete, can be moved toward a valve seat in a direction that is generally parallel to a direction of flow through the valve seat. In other words, the valve member does not move tangentially toward the valve seat when the closing movement is nearly over. That is, the valve member does not move in a largely perpendicular manner relative to the direction of flow, but is moved toward the valve seat in the manner of a flap in a generally perpendicular manner toward the valve seat (i.e., generally parallel to a direction of flow through the valve seat). It should be appreciated that the flap can also be referred to as a "trumpet valve". According to one aspect, the EGR valve may permit a simple design for the valve member itself and its trajectory, and at the same time provide a reliable closing of an exhaust-gas recirculation line. In one embodiment, the ERG valve is suitable for low-pressure ERG systems in which low pressure differentials arise, although other applications are contemplated, as the present invention is not limited in this respect.

In one embodiment, rotation of the cam member causes the rotational axis to rotate. In one embodiment, the rotational axis is "physically" present as a pin, shaft or the like that is supported in a suitable manner. The rotational shaft is, in one embodiment, a member separate from the valve member and/or the shaft's support assembly, although the present invention is not limited in this respect. In one embodiment, the valve member is attached to the rotational shaft by a suitable tab which in turn can be formed by a separate member. Other suitable attachment arrangements may be employed, as the present invention is not limited in this respect.

In one embodiment, the rotational shaft, around which the valve member can be rotated, is a continuous shaft. However, the shaft need not be continuous, as the present invention is not limited in this respect. Further, in one embodiment the valve member may be supported on one side. Other suitable support arrangements may be employed, as the present invention is not limited in this respect.

In one embodiment, the valve member can be provided outside a tubular portion, the end of which forms the valve seat. In another embodiment, the valve seat is provided as an aperture within a tubular portion. A valve seat with which the valve member can be brought into contact is formed inside the tubular portion. Other suitable valve seats may be employed, as the present invention is not limited in this respect.

In one embodiment, the valve member is provided within the tubular portion. This valve member can be arranged at an edge of the tubular portion within suitable recesses whenever the valve member is open in order to influence the flow through the tubular portion to as minimum an extent as possible. The aforementioned tubular portion can, for example, be an EGR line. Equally, the valve can also be part of the intake channel—i.e., the intake path of an internal combustion engine in which recirculated exhaust gas and fresh air are mixed. Other suitable arrangements may be employed, as the present invention is not limited in this respect.

In one embodiment, the valve member includes at least one aperture that can be opened during the course of an opening movement before the valve member is separated from the valve seat. One benefit for this lies in the fact that the EGR valve may be used for low-pressure EGR systems in which the opening process—even when this occurs in the flow path and hence is assisted thereby—can be brought about against a counterpressure. It is likewise conceivable for the valve member to be opened "against" the flow. In this case, too, a pressure differential that can impede the valve-opening process can be reduced by opening an aperture within the valve member first and the opening movement takes place afterward. Of course the present invention is not limited in this regard, as an aperture need not be employed.

In one embodiment, the valve member is attached in a resilient and flexible manner with respect to the tab. In embodiments in which the valve member has an aperture, attaching the valve member in a flexible and resilient manner may provide certain benefits regarding the release of the aperture irrespective of the valve member's opening movement. Other suitable attachment arrangements may be employed, as the present invention is not limited in this respect.

In one embodiment, a closing member for the aperture in the valve member is provided. The closing member is separate from a tab to which the valve member is attached.

Turning now to the figures and in particular to FIG. 1, an exhaust-gas recirculation (EGR) valve 10 is shown. The valve 10 includes a rotary drive 12 with a cam member 14 that is provided with a cam profile 16. In this embodiment, the cam member 14 has teeth on the outer circumference of the cam member. The teeth can be used to drive the cam member in a rotational manner. In one embodiment, a drive 52, for example an electric motor, is used to drive the cam member. Other suitable drive systems and/or arrangements may be employed, as the present invention is not limited in this respect.

Cam member 14 includes shaft 32. Roller 34 engages with the cam profile. The roller is supported on a lever 50 that is mounted on a rotational shaft 18 of the valve member 20. As can be seen in FIG. 1, the cam profile, in terms of its progression in the circumferential direction, extends from a point close to the rotational shaft 32 to a point close to the outer, serrated circumference of the cam member 14. As a result, a rotation of the cam member 14 brings about a rotation of the lever 50, and hence of the rotational shaft 18 as well as of the valve member 20. In the embodiment illustrated in FIG. 1, the valve member 20 is secured to the rotational shaft 18 by means of a tab 24, which can be more readily seen in FIG. 2.

Figure 2:
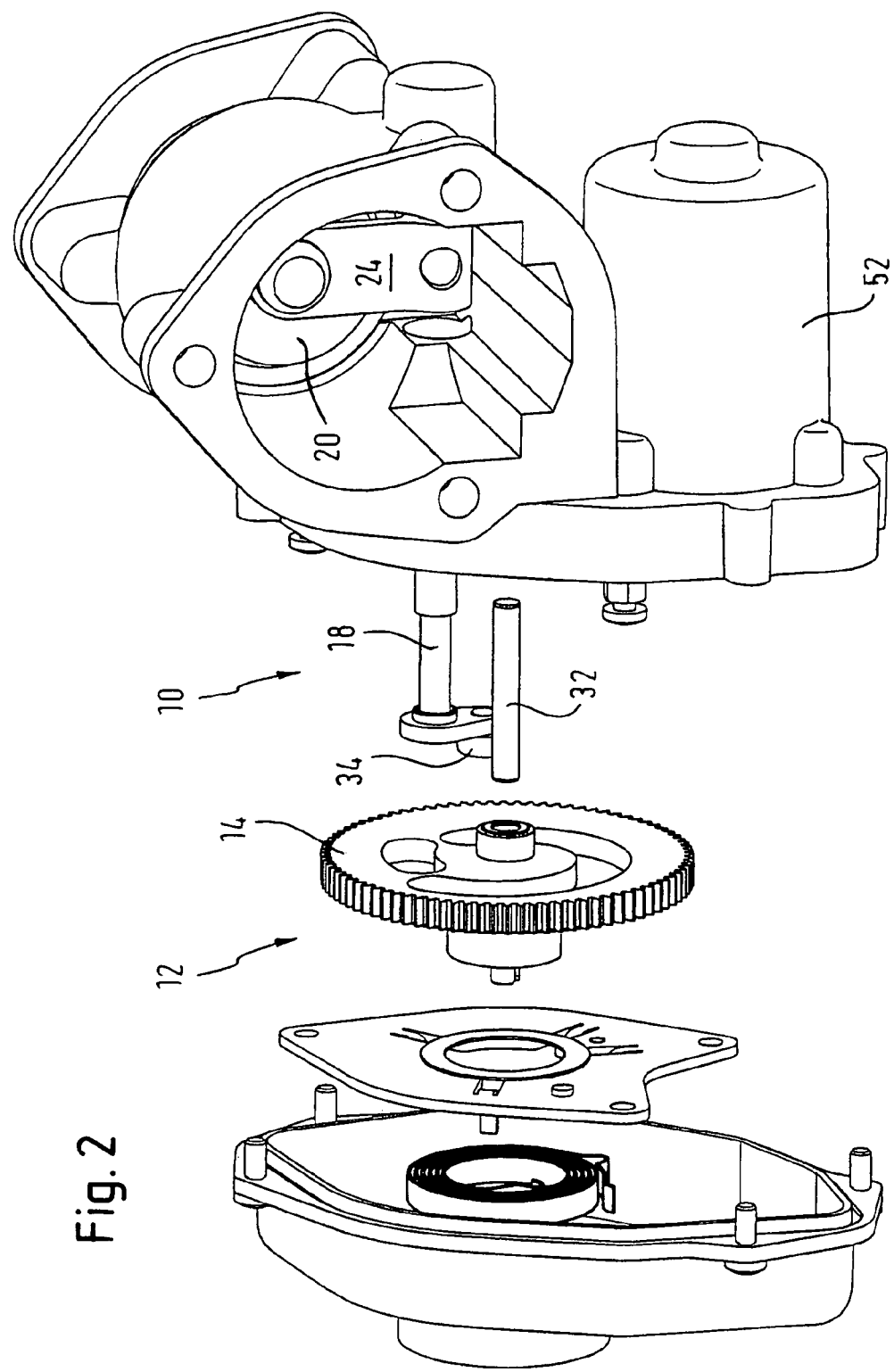
FIG. 2 is an exploded perspective view of the exhaust-gas recirculation valve of FIG. 1 in its closed state.

In one embodiment, the valve member 20 is generally circular in shape and is attached at its center. As can be seen in FIG. 2, the tab 24, which attaches the valve member 20 (see FIG. 1) to the rotational shaft 18, can be wrapped around the rotational shaft 18 (region 50 in FIG. 1).

In the open position of the valve member 20, in one embodiment, as shown in FIG. 1, the valve member is suitably accommodated within a recess 36 of a tubular portion 26 so that it does not permanently influence the flow through the tubular portion 26. The valve seat 22 can be identified within the tubular portion 26 and can take a tapered form, although the present invention is not limited in this respect.

During the course of the closing movement, as shown in FIG. 1, the valve member 20 essentially moves, over a quadrant, out of the depicted "horizontal" open position of FIG. 1 toward the valve seat 22. At the start of the closing movement, the valve member 20 moves generally perpendicular to the direction of flow through the valve seat 22. As shown in FIG. 1, this direction of flow moves from the top right to left or vice versa. Toward the end of the closing movement, the valve member 20 moves generally in parallel with this direction of flow. It should be appreciated that the valve member as a whole can execute a pivoting movement, with the result that the aforementioned "linear" directions are applicable to the tangent at the pivoting movement at the particular point in question.

This is additionally evident in FIG. 2, which illustrates the closed state of the EGR valve 10 shown in FIG. 1. A comparison of FIG. 2 with FIG. 1 shows that the cam member 14 has moved clockwise so that the lever 50, too, has been rotated in this direction, and the valve member has assumed the closed position. In one embodiment, tab 24 secures the valve member 20 to the rotational shaft 18, as shown in FIG. 2. In one embodiment, as can be seen in FIGS. 1 and 2, the tubular portion 26 preferably has a cross section that is as circular as possible, although other suitable valve seat configurations may be employed, as the present invention is not limited in this respect.

Figure 3:
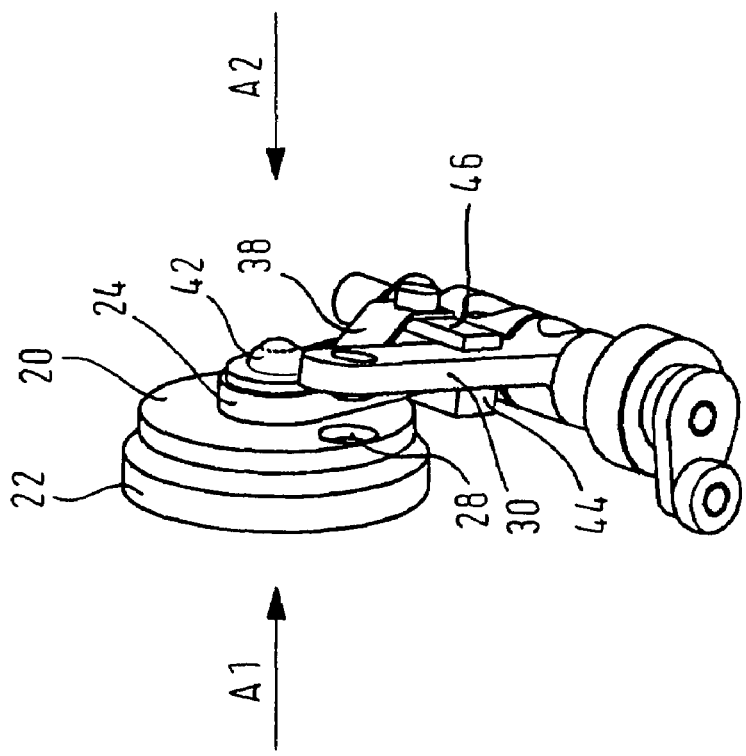
FIG. 3 is a perspective view of an exhaust-gas recirculation valve according to a second embodiment.

FIG. 3 is a perspective view illustrating a second embodiment of an exhaust-gas recirculation valve. This embodiment is similar to that described with reference to the embodiments shown in FIGS. 1 and 2. The embodiment shown in FIG. 3 differs from the embodiment in FIGS. 1 and 2 in that, in one embodiment, the attachment of the valve member 20 to the tab 24 is configured to be movable by means of a spherical cap (not shown) and a spring (not shown). In one embodiment, the valve member is secured to the tab 24 by means of a screw that has a head 42 and that is slidably supported within the tab 24. The valve member 20 can, by means of the spherical cap, be tilted to a certain extent in relation to the tab 24. To avoid opening caused by the exhaust-gas pressure in the direction of flow A1, the spring is suitably adjusted via the screw. In the embodiment shown here, the valve member 20 contains an aperture 28 that can be closed by a separate closing member 30. In one embodiment, this closing member 30 has a spherical end. In one embodiment, a first drive catch 44 for carrying along the tab 24 during the course of the opening movement, and a second drive catch 46 for carrying along the tab 24 during the course of the closing movement are also provided on the closing member 30. The drive (not shown) is effected via the closing member 30. In particular, this closing member 30 is driven and the tab 24 supported at the closing member 30 is carried along by the drive catches 44 and 46 in the respective direction, thereby operating the valve member 20. In addition, in one embodiment, a retaining spring 38 is provided for the tab 24.

"A1" designates the direction of flow through the valve seat 22. If the EGR valve 10 is used in a low-pressure exhaust-gas recirculation system, a pressure that obstructs the opening movement of the valve member 20 can prevail, in spite of the gas flow in direction A1, on the opposite side, i.e. the right-hand side of FIG. 3. In one embodiment, this pressure can be reduced in that the aperture 28 is first opened during the course of the opening movement by moving the closing member 30 to the right so that the pressure differential at the valve member 20 is equalized. The valve member can then be opened with minimum force.

Moreover, it is possible to regulate small EGR flows via the separate aperture 28 within the valve member 20. As an alternative to direction of flow A1, the flow can also pass through the valve in the opposite direction A2. Likewise, a useful regulatory quality for small mass flow rates is achieved by the closing member 30. Further, a drop in pressure can be brought about, thus permitting the use of a "weaker" drive for the opening operation against the direction of flow. When the valve is closed, the direction of flow A2 is beneficial inasmuch as its contact force has a supportive effect in order to keep any leaks to a minimum.

Figure 4:
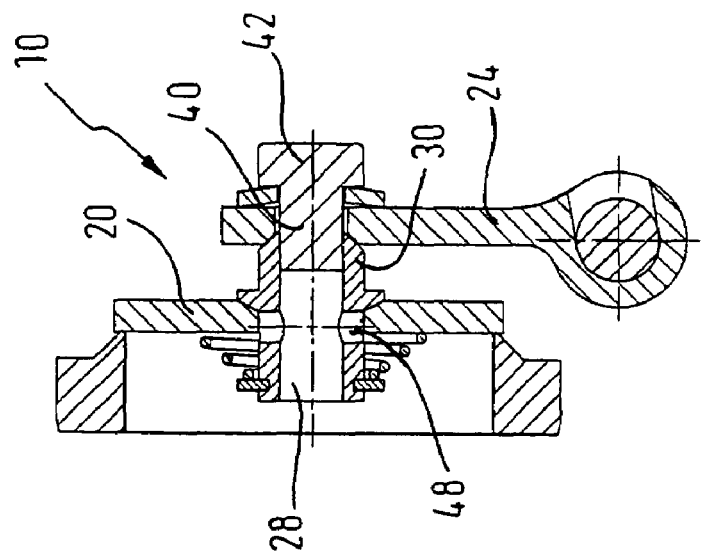
FIG. 4 is a schematic side view of an exhaust-gas recirculation valve according to a third embodiment.

FIG. 4 depicts an EGR valve 10 according to a further embodiment. In this embodiment, the valve member 20 also has an aperture 28 generally at the center of the valve member 20. In one embodiment, the valve member 20 is attached to the tab 24 by means of a pin 40 that has a head 42. In one embodiment, a closing member 30 for the aperture 28 is provided on the pin 40. In one embodiment, the closing member is generally hat-shaped or U-shaped. For this purpose, the closing member 30 has at least one aperture 48 along the circumference of the closing member. When the closing member 30, starting out from the position shown in FIG. 4, is moved to the right, the two sides of the valve member 20 communicate with one another via the aperture 48 within the closing member 30 and via the aperture 28 within the valve member 20. As a result, a pressure differential can be reduced and at the same time a useful regulatory quality can be obtained for low mass flow rates.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the description and drawings herein are by way of example only.

What is claimed is:

1. An exhaust-gas recirculation (EGR) valve comprising a rotary drive, said rotary drive having a cam member with a cam profile, said rotary drive permitting operation of a valve member that can be rotated around a rotational shaft, a rotation of said cam member resulting in a rotation of said rotational shaft, wherein during the course of a closing movement, said EGR valve can, toward the end of the closing movement, move toward a valve seat in a direction that is generally parallel to a direction of flow through said valve seat, wherein said valve member comprises at least one aperture that can be opened during the course of an opening movement before said valve member is separated from said valve seat.

2. The EGR valve according to claim 1, further comprising a closing member for said aperture within said valve member, said closing member being separate from said tab.

3. An exhaust-gas recirculation (EGR) valve, comprising:
   a rotary drive;
   a cam member having a cam profile, said cam member cooperating with said rotary drive;
   a shaft rotatably cooperating with said cam member whereby a rotation of said cam member results in a rotation of said shaft;
   a valve member cooperating with said shaft whereby said rotary drive rotates said valve member about said rotational shaft; and
   a valve seat cooperating with said valve member;
   wherein during the course of a closing movement and toward the end of the closing movement, said valve member moves toward said valve seat in a direction that is generally parallel to a direction of flow through said valve seat,
   wherein said valve member comprises at least one aperture that can be opened during the course of an opening movement before said valve member is separated from said valve seat.

4. The EGR valve according to claim 3, further comprising a closing member for said aperture within said valve member, said closing member being separate from said tab.

* * * * *